United States Patent
Sarayeddine et al.

(10) Patent No.: US 7,646,541 B2
(45) Date of Patent: Jan. 12, 2010

(54) BACKLIGHTING SYSTEM FOR A LIQUID-CRYSTAL DISPLAY SCREEN AND CORRESPONDING DISPLAY DEVICE

(75) Inventors: Khaled Sarayeddine, Nouvoitou (FR); Jean-Jacques Sacre, Chateaugiron (FR); Thierry Borel, Noyal sur Vilaine (FR)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 11/641,194

(22) Filed: Dec. 19, 2006

(65) Prior Publication Data

US 2007/0146647 A1    Jun. 28, 2007

(30) Foreign Application Priority Data

Dec. 22, 2005  (FR)  .................................. 05 54050

(51) Int. Cl.
*G02B 3/00* (2006.01)
(52) U.S. Cl. .................. 359/649; 362/329; 362/97.1
(58) Field of Classification Search .................. 362/19, 362/29, 30, 310, 328, 329, 335, 97.1; 359/649, 359/630, 728
See application file for complete search history.

(56) References Cited

U.S. PATENT DOCUMENTS

| | | | | |
|---|---|---|---|---|
| 5,467,154 A | * | 11/1995 | Gale et al. | ................... 353/119 |
| 5,594,561 A | * | 1/1997 | Blanchard | ..................... 349/59 |
| 6,902,310 B2 | * | 6/2005 | Im | .............................. 362/558 |
| 2003/0067691 A1 | | 4/2003 | Kurematsu et al. | |
| 2007/0091466 A1 | * | 4/2007 | Schubert et al. | ............. 359/742 |

FOREIGN PATENT DOCUMENTS

| | | |
|---|---|---|
| EP | 806 693 A | 11/1997 |
| WO | WO 02/069030 A | 9/2002 |
| WO | WO 2005/096094 A | 10/2005 |

OTHER PUBLICATIONS

Search Report dated Jul. 27, 2006.

* cited by examiner

*Primary Examiner*—Gunyoung T Lee
(74) *Attorney, Agent, or Firm*—Robert D. Shedd; Jeffrey M. Navon

(57) ABSTRACT

The invention relates to a backlighting system for a liquid-crystal display screen, comprising:
  an illumination source producing an illumination beam;
  an objective illuminated by said illumination beam;
  at least one folding mirror illuminated by the illumination beam coming from the objective; and
  a Fresnel lens capable of collimating and redirecting the illumination beam reflected by said at least one folding mirror, the beam transmitted by the Fresnel lens being intended to back-light said display screen.

11 Claims, 7 Drawing Sheets

PRIOR ART

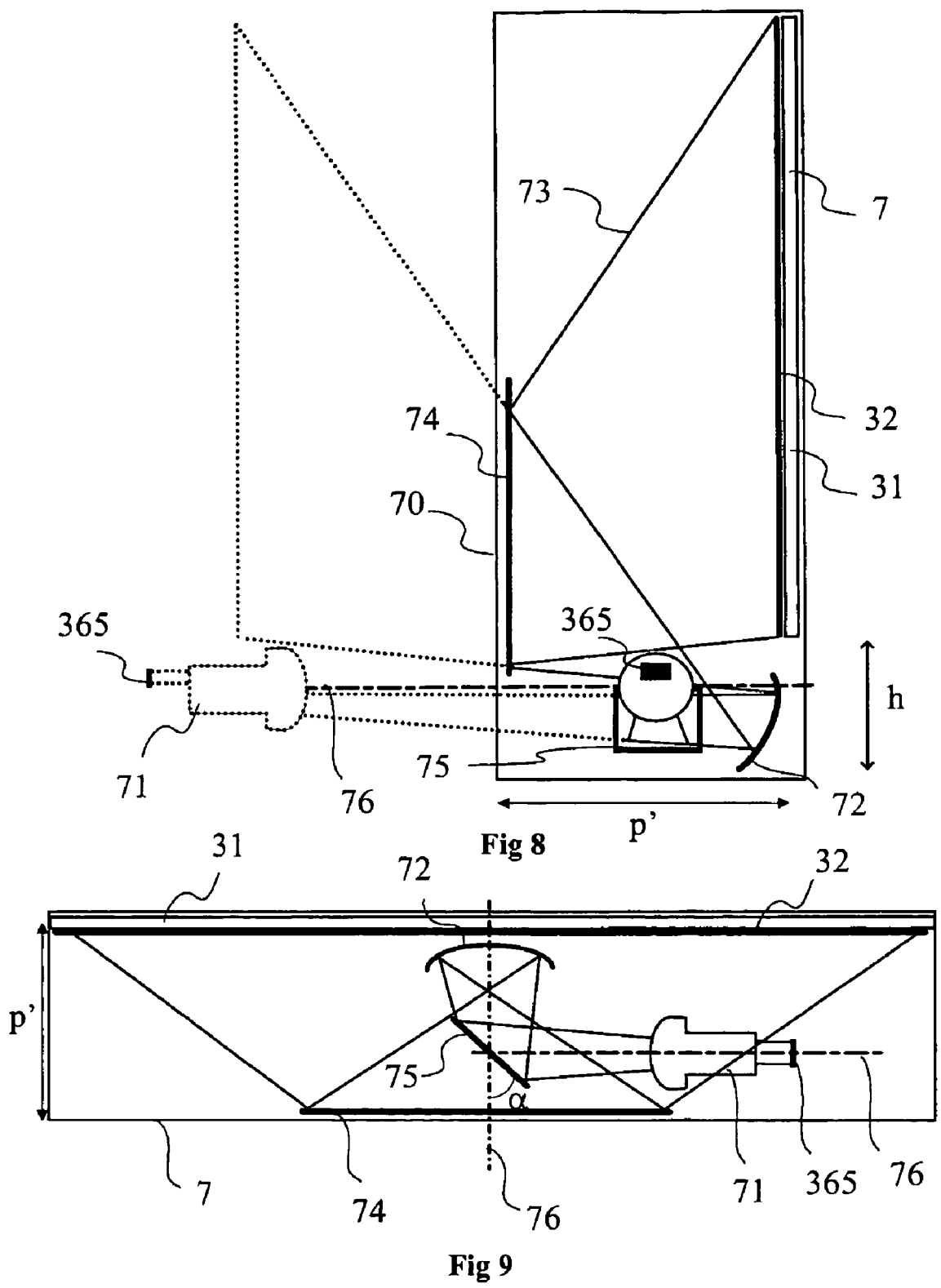

BACKLIGHTING SYSTEM FOR A LIQUID-CRYSTAL DISPLAY SCREEN AND CORRESPONDING DISPLAY DEVICE

This application claims the benefit, under 35 U.S.C. § 119 of French Patent Application 0554050, filed Dec. 22, 2005.

FIELD OF THE INVENTION

The invention relates to the field of liquid-crystal displays or LCDs.

More precisely, the invention relates to the backlighting of such displays.

PRIOR ART

According to the prior art, the backlighting of LCD displays (especially large displays of the television type) are based on a diffuser system illuminated by cold cathode lamps. Such a display 1 is illustrated in FIG. 1 (in front view) and FIG. 2 (in side view). The display 1 comprises an LCD screen 10 on its front face, a diffuser 11 placed behind the LCD screen 10 and several lamps 120 to 127 distributed in a regular fashion on the rear of the display. The lamps 120 to 127 emit a light beam towards the diffuser 11. The diffused incident light beam thus back-lights the LCD screen 10.

This technique has the drawbacks of requiring an acceptable luminance for these large displays, that imply a large number of lamps, and expensive management of the thermal problems. Moreover, the LCD technology of these displays offers a low average contrast (about 300:1) which limits the rendition of the signal and in particular the video signal, and especially for professional applications in which image quality is an aspect of primary importance.

Patent document WO 02/069030 entitled "high dynamic range display device" filed by the University of British Columbia discloses a system with backlighting using a first modulator that modulates an illumination beam illuminating a second modulator, which may be of the LCD screen type. Thus, the contrast is enhanced. However, such a system has a large depth and therefore the drawback of being bulky.

SUMMARY OF THE INVENTION

The object of the invention is to alleviate these drawbacks of the prior art.

More particularly, the objective of the invention is to reduce the size of an LCD display with a backlighting system using a projected backlighting beam.

For this purpose, the invention proposes a backlighting system for a liquid-crystal display screen, comprising:
- an illumination source producing an illumination beam;
- an objective illuminated by the illumination beam;
- at least one folding mirror illuminated by the illumination beam coming from the objective; and
- a Fresnel lens capable of collimating and redirecting the illumination beam reflected by the folding mirror or mirrors, the beam transmitted by the Fresnel lens being intended to back-light said display screen.

Advantageously, at least one folding mirror is an aspherical mirror.

According to one particular feature, at least one of said folding mirrors is a concave mirror.

Advantageously, according to this feature, the objective is designed to produce an imaging beam and to construct a first image positioned after the objective, the concave mirror being positioned after said first image in the path of the illumination beam and constructing, from the first image, a second image on a projection plane.

Preferably, the first image is off-axis with respect to the optical axis of the objective.

According to one advantageous feature, the concave mirror has an optical axis positioned on the optical axis of the objective.

According to one particular feature, the system includes a mask comprising a black zone that absorbs the parasitic rays and a transparent zone placed in the path of the illumination beam after the concave mirror.

Preferably, the source includes a beam modulator.

According to one particular feature, the system includes means for polarizing the illumination beam, said means being placed before the beam modulator. For example, this is a polarizer or a polarization recovery device.

Advantageously, the source includes means for producing a sequentially coloured beam.

According to one particular feature, the system includes a diffuser placed behind the Fresnel lens.

The invention also relates to a display device comprising a liquid-crystal display screen and a backlighting system as illustrated above according to the invention, and comprising:
- an illumination source producing an illumination beam;
- an objective illuminated by the illumination beam;
- at least one folding mirror illuminated by the illumination beam coming from the objective; and
- a Fresnel lens capable of collimating and redirecting the illumination beam reflected by the folding mirror or mirrors, the beam transmitted by the Fresnel lens being intended to back-light the display screen.

LIST OF THE FIGURES

The invention will be more clearly understood, and other features and advantages will become apparent, on reading the following description, which is given with reference to the appended drawings in which:

FIGS. 7 to 12 illustrate a display device with an LCD display according to an alternative embodiment of the invention.

DETAILED DESCRIPTION OF THE INVENTION

Figure 3:
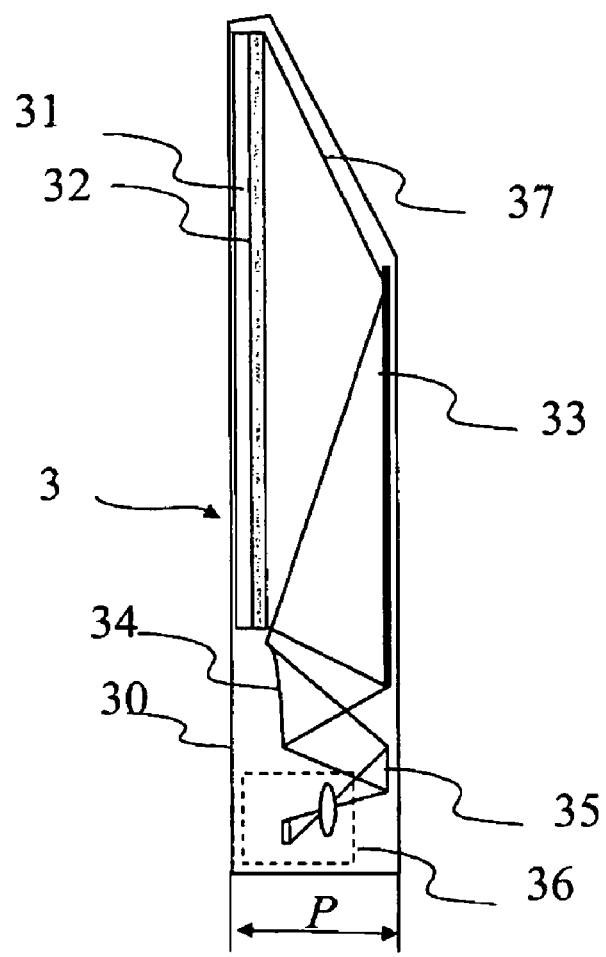
FIG. 3 shows a display device with an LCD display according to one particular embodiment of the invention.

FIG. 3 shows a display device 3 with an LCD display 31 according to one particular embodiment of the invention.

The device 3 comprises:
- a projection source 36 that generates a projection beam 37;
- a first plane folding mirror 35 illuminated by the beam 37 output by the source 36;
- a second folding mirror 34 illuminated by the beam 37 reflected by the mirror 35;
- a third folding mirror 33 illuminated by the beam 37 reflected by the mirror 34;
- means 32 for collimating and diffusing the backlighting beam;

a colour LCD screen 31 back-lit by the beam collimated by and diffused through the means 32; and a case 30 enclosing the elements 31 to 36.

The LCD screen 31 is a screen for displaying an image. For example, this is a screen of the MVA (Multidomain Vertically Aligned), IPS (In-Plane Switching) or TN (Twisted Nematic) type.

Figure 1:
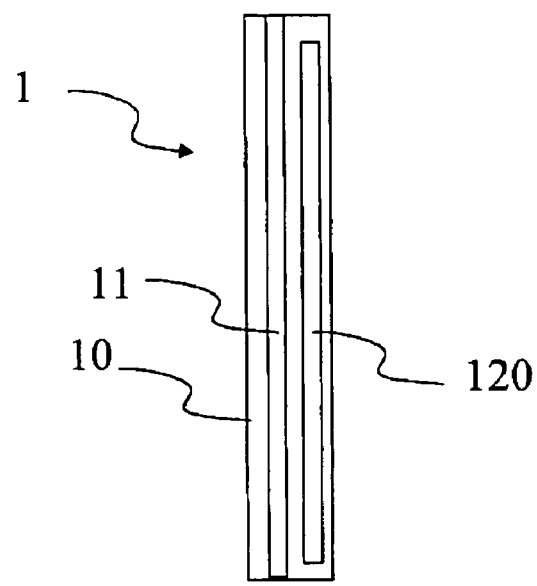
FIGS. 1 and 2 illustrate an LCD display with backlighting known per se.
Figure 2:
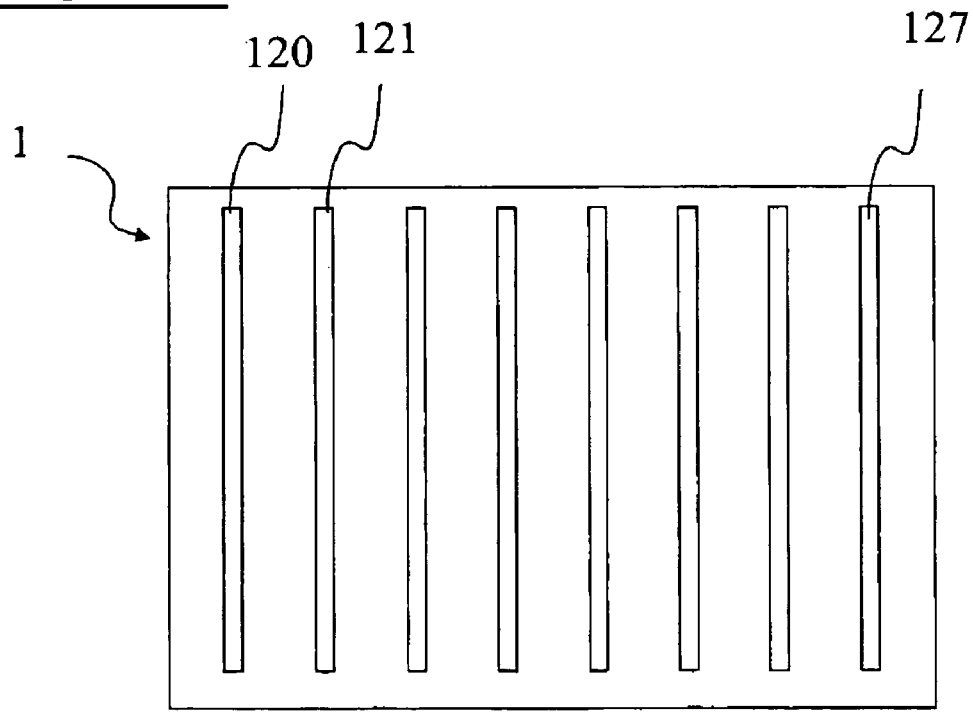

The system 3 has a configuration allowing it to be thin. The folding mirrors 33 to 35 fold the beam 37 several times and therefore allow the case 30 to have a small depth, preferably less than 25 cm. It therefore makes it possible to maintain a small thickness, such as the conventional LCD displays as illustrated in FIGS. 1 and 2. Moreover, the system offers the advantage of increasing the contrast of the LCD screen 31 by a factor of more than 100.

The source 36 itself comprises an objective with a front lens group and a rear lens group that are placed on either side of a diaphragm. According to one particular embodiment, the mirror 34 is a convex mirror, preferably a hyperbolic mirror. This allows the depth of the device 3 to be reduced even further. According to one embodiment in which the mirror 34 is a hyperbolic mirror, a first focus of the mirror lies substantially in the plane of the pupil of the front lens group/hyperbola assembly that is located on the opposite side from the hyperbolic mirror with respect to the front lens group, whereas the second focus lies substantially in the plane of the exit pupil of the front lens group. Thus, the hyperbolic mirror 34 is used to conjugate these two pupils.

Advantageously, the rear lens group and/or the front lens group comprises at least one optic for correcting geometrical distortions that has a surface in the form of a conic. Preferably, this optic for correcting geometrical distortions is located in the rear lens group and has a surface of hyperbolic shape. In addition, this optic for correcting geometrical distortions is preferably located in a region far from the diaphragm of the objective. The conics of the hyperbolic mirror and of the optic for correcting geometrical distortions may be in a ratio that is substantially proportional to the ratio of the positions of the foci of the hyperbola, that is to say the ratio of the distance between the exit pupil of the front group and the focus of the hyperbola, to the distance between the pupil of the front lens group/hyperbola assembly and the focus of the hyperbola.

Figure 4:
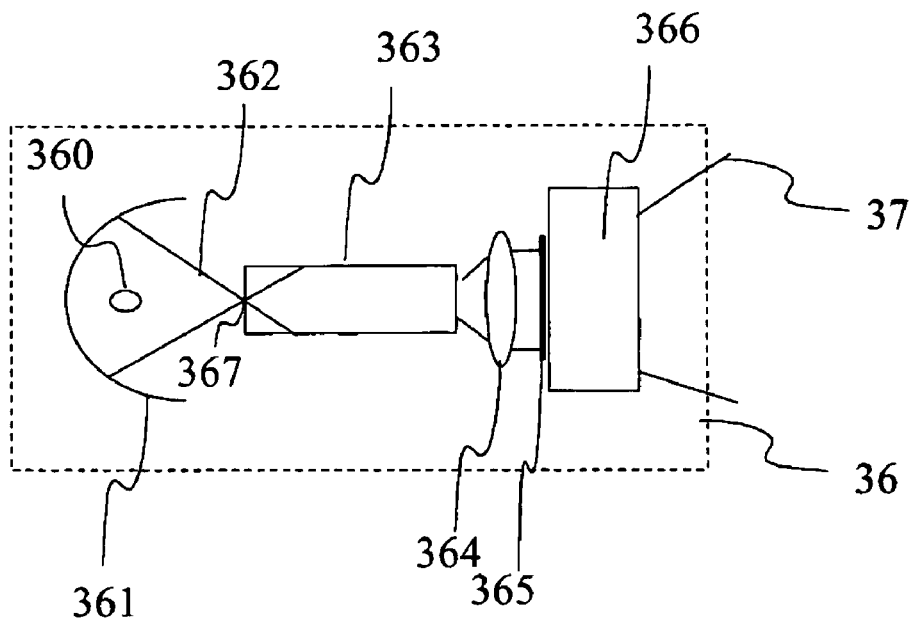
FIG. 4 illustrates a projection source for the display of FIG. 3.

FIG. 4 illustrates an embodiment of the projection source 36.

The source 36 comprises:

an elliptical reflector 361;

a white light source 360 that produces an illumination beam 362 and is placed at the first focus of the reflector 361 (the reflector 361 thus reflects the beam 362 onto the second focus 367 of the reflector 362);

a light guide 363, the entry of which is placed at the second focus 367 which guide allows several images of the source 360 to be created;

a relay lens 364 that collimates the illumination beam output by the light guide 363;

an optical modulator 365 placed behind the lens 364, creating a modulated beam from the illumination beam; and a projection objective 366 positioned in the path of the modulated beam.

According to an alternative embodiment, the light guide 363 and the relay lens 364 are replaced with any other means allowing the illumination of the light modulator 365 to be made uniform (for example a matrix of microlenses).

The objective 366 comprises lenses shaped so as to enlarge the illumination rectangle created by the beam 367. To reduce the cost of the objective 366, a field lens is placed at the exit of this integrator, making it possible in particular for the objective to work with telecentric illumination. Telecentric illumination at the modulator makes it possible in particular to increase the flux if the optical modulator is of the DMD type and the contrast if the optical modulator is of the LCD or LCOS type. According to an alternative embodiment of the invention, the illumination beam is convergent and not telecentric.

The optical modulator 365 is, for example, of the LCD, LCOS or DMD type. If the optical modulator 365 is of the LCD type, the illumination of the LCD is prepolarized, a polarizer or polarization recovery device being placed before the optical modulator. Since a polarized beam illuminates the LCD screen 31, an analyser is placed after the modulator, the polarization at the exit of the analyser being chosen so as to have the same direction as the entry polarizer of LCD screen 31 (the illumination beam output by the analyser is polarized in a direction such that the polarization is not lost at the entry of the polarizer located in front of the LCD matrix of the screen 31). This makes it possible to reduce the loss of flux by a factor of at least 50%. If the optical modulator is of the LCOS type, it is positioned between a polarizer and an analyser placed at the entry and the exit of a grating polarizer (of the Moxtek type) or glass-type polarization splitter. According to one embodiment of the invention, there is no analyser after the optical modulator, a polarizer being positioned before the LCD display, allowing the imaging beam transmitted by the modulator to be analysed. In the case in which the modulator is of the DMD type, the signal does not need to be polarized.

The contrast of the modulator 365 does not need to be high. A value of 100 to 200:1 is sufficient to enhance the contrast of the LCD-TV. This also makes it possible to reduce the constraints on the contrast of the LCD screen 31 itself. The latter may also have a contrast of around 300:1—the final contrast of the image may reach a value of more than 30000:1 to 60000:1. Preferably, the luminance is between $10^{-2}$ Cd/m$^2$ and $3 \times 10^4$ Cd/m$^2$.

Figure 5:
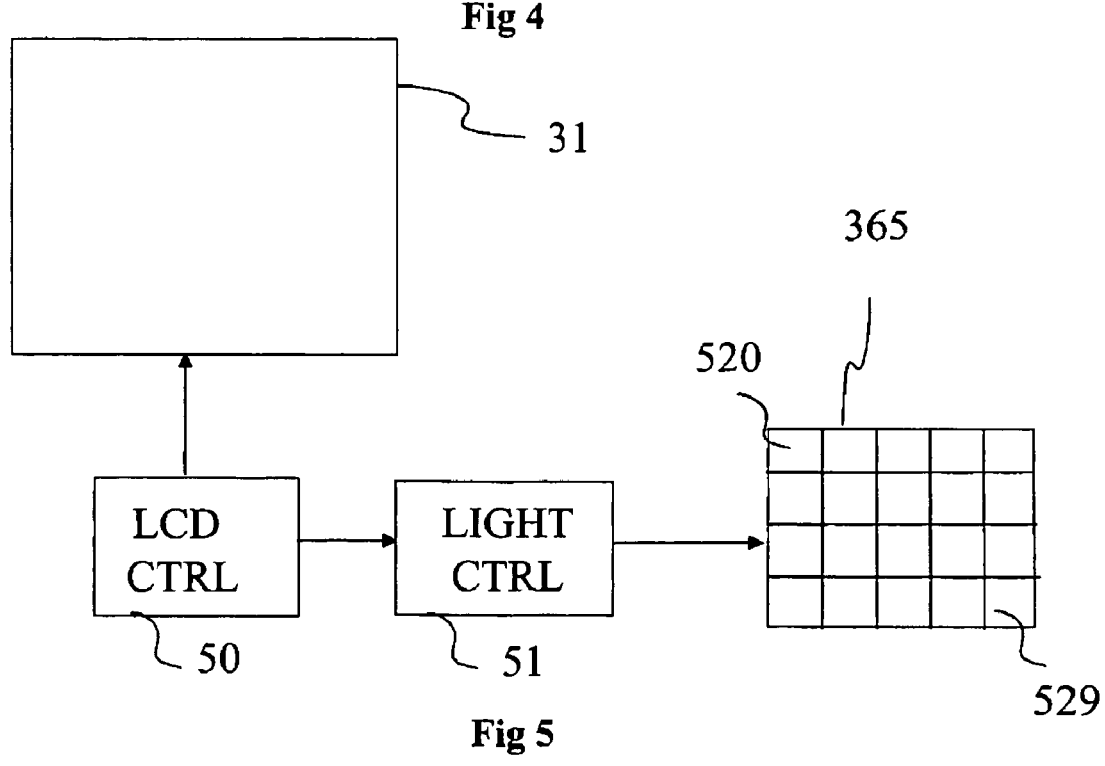
FIG. 5 shows schematically the backlighting control means for the display of FIG. 3.

FIG. 5 describes how the display 31 and the modulator 365 are controlled.

The system comprises a controller 50 for controlling the display 31. It receives data representative of an image to be displayed and drives the display 31 so that it displays the corresponding image. The controller 50 transmits all or some of this data to an electronic controller 51 that controls the modulator 365.

The resolution of the modulator 365 is low and, for example, of the VGA type comprising a matrix of 640×480 pixels. The modulator 365 modulates the signal in the white. Advantageously, the modulator comprises specific regions 520, 529, for example comprising a matrix of size of 20 pixels by 20 pixels. Within a region 520, 529, the pixels are controlled at the same time. Thus, the modulator is simplified and its cost is reduced. In the case of a modulator 365 of the LCD type, it is positioned between a polarizer and an analyser. The electronic controller calculates the modulation signal and controls the modulator 365 via this signal. The brighter the region of a displayed image, the brighter the intensity of the beam passing through the corresponding region of the modulator 365, this region letting through a greater light flux of the illumination beam. Thus, the intensity of the regions of the modulator 365 is modulated according to the video content of the image that addresses the LCD screen 31. This allows the contrast of the image displayed by the screen 31 to be enhanced.

According to a variant, the modulator 365 has a high resolution and each region corresponds to one pixel and is associated with a pixel displayed by the LCD screen 31.

According to one embodiment of the invention, the illumination beam illuminating the modulator 365 is a colour beam. Such a colour beam sequentially takes on the primary colours of the image displayed (for example, red, green and blue) and is, for example, obtained using colour light-emitting diodes that illuminate the modulator 365 or by inserting a colour wheel in the path of the illumination beam (for example at the second focus 367). The colour sequence of the illumination beam is synchronized with the corresponding pixels displayed in the colour LCD screen. Such synchronization is provided by the control elements 50 and 51. According to an alternative embodiment that allows the cost to be reduced and the actual resolution of the LCD screen to be increased (typically by a factor of 3), the LCD screen is in black and white (it does not include pixels with a colour filter) and it is the colour backlighting beam that determines the colour of the pixels displayed. Advantageously, the modulator 365 is a high-speed modulator, for example of the DMD or LCOS type.

According to a variant of the invention, a projection source is used that does not include a modulator. Moreover, this source is similar to the source 36 and comprises:
the elliptical reflector 361;
the white light source 360 that produces an illumination beam 362 and is placed at the first focus of the reflector 361;
the light guide 363, the entry of which is placed at the second focus 367, which light guide allows several images of the source 360 to be created;
a relay lens 364 that collimates the illumination beam output by the light guide 363; and
a projection objective 366 positioned behind the relay lens in the path of the illumination beam.

In a variant of the invention, placed behind the relay lens, substantially in a region corresponding to the imaged plane of the source 360, are a uniformity filter making the beam illuminating the LCD screen uniform, should this be necessary (especially if there is a loss of illumination in the corners), and/or a polarization filter.

Preferably, the light guide 363 is of rectangular cross section with proportions equal to or close to the proportions of the LCD screen so that the illumination beam has substantially the same cross section as the LCD screen at the screen (preferably it is the same size as or slightly larger than the display in order to illuminate the entire display).

According to a variant of the invention, a reflector is used whose shape allows a rectangular beam to be obtained, or a mask that allows the rays outside a rectangle to be eliminated so that the shape and size of the beam are matched to those of the LCD screen.

According to one particular embodiment of this variant, there is no relay lens, the projection function of the illumination beam being provided by an objective that combines the optical functions of the relay lens 364 with those of the projection objective 366.

According to one particular embodiment not employing a modulator, the source includes means for sequentially colouring the beam. These means and their functions are similar to the corresponding means and functions of the abovementioned colour-wheel variant.

Figure 6:
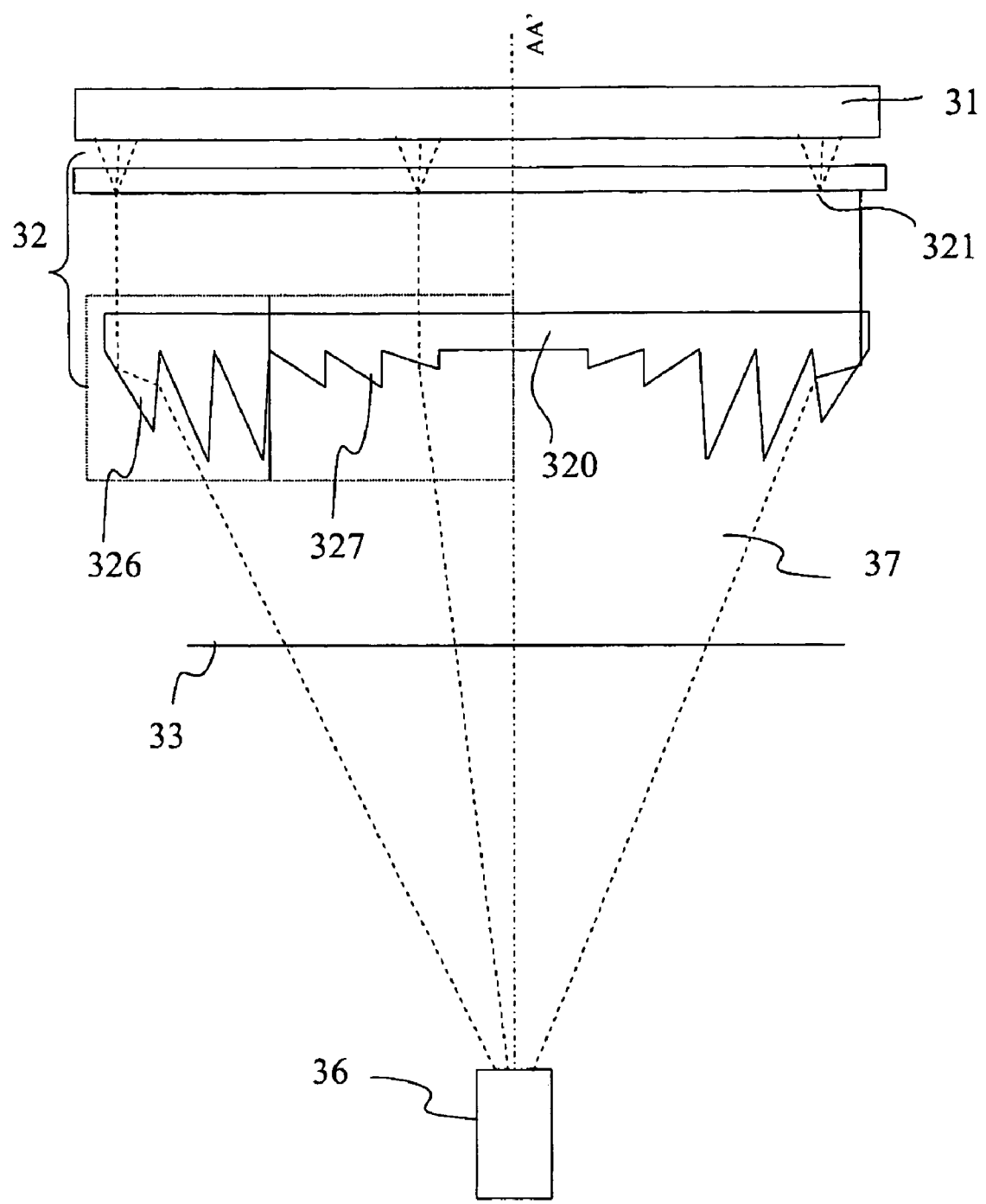
FIG. 6 shows the diffusion and collimation of the backlighting beam in the display of FIG. 3.

FIG. 6 shows schematically, in a top view, the means 32 for collimating and diffusing the backlighting beam, which means comprise:
a Fresnel lens 320 that collimates the incident beam 37; and
a diffuser 321 that diffuses the collimated beam onto the screen 31.

In FIG. 6, the beam 37 shown in dotted lines is in the unfolded form in order to make the figure easier to examine.

In reality, the beam 37 output by the source 36 is folded by the folding mirrors, and especially the mirror 33.

The beam diffused by the diffuser 321 back-lights the LCD screen, comprising in succession a polarizer, an LCD layer and an analyser.

The diffuser allows the collimated beam to be diffused over a region that preferably makes an angle of ±85° in a horizontal plane along a normal to the display. Thus, a relatively wide field of view is obtained.

According to the invention, the device is thin. The angles of incidence of the illumination beam are therefore high. To limit parasitic reflections of the illumination beam, the Fresnel lens 320 has a plane exit face and, on its prismatic entry face, it comprises:
a central region 327, called refractive region, where the rays of the incident beam 37 are refracted by a prism entry face towards the exit face of the lens 320; and
a peripheral region 326, called reflective region, where the rays of the incident beam 37 are refracted by a prism entry face towards a second prism face that reflects the refracted rays towards the exit face of the lens 320.

Of course, according to the invention, other Fresnel lenses may be employed, especially Fresnel lenses with only refractive prisms or only reflective prisms and/or with a prismatic exit face (it then being possible for the entry face to be plane).

Figure 7:
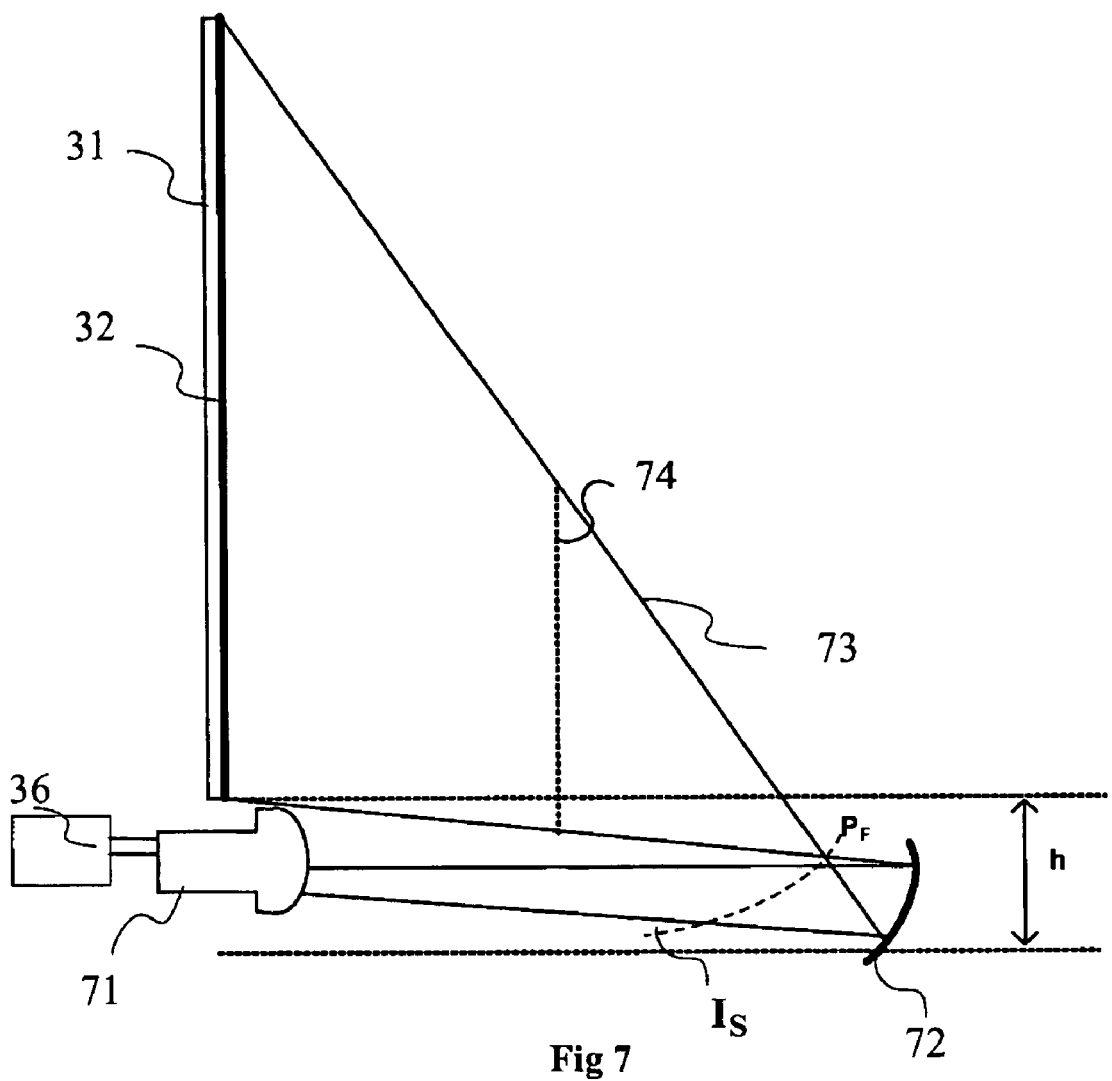

FIG. 7 shows schematically (and in exploded form) a display device 7 with an LCD display 31 according to one particular embodiment of the invention, with a concave aspherical folding mirror.

The device 7 comprises:
a source 37;
an objective 71 illuminated by the beam 37 produced by the source 37;
a concave aspherical mirror 72 that enlarges the image of the beam 37 to form a beam 73, while folding the beam;
a folding mirror 74 that receives the beam 73, preferably a vertical plane mirror;
means 32 for collimating and diffusing the backlighting beam, which means are illuminated by the beam 73 reflected by the mirror 74;
a colour LCD screen 31 back-lit by the beam collimated by and diffused through the means 32; and
a case 70 enclosing the elements 37, 71 to 74, 31 and 32.

To make FIG. 7 easier to examine, the beam 73 has been shown not folded by the mirror 74). The optical part of the device 7 has an optical axis 76, the optical beam 37, 73 produced being off-axis (as is therefore the modulator) with respect to this axis 76. The mirror 72 is such that, seen from the means 32, the beam 73 seems to come from a pupiliary region, corresponding to a pupil $P_F$ located between the mirror 72 and the means 32 in the path of the beam 73.

The concave aspherical mirror 72 has an axisymmetric shape, the reflecting surface of which is given by the following aspherical surface equation:

$$Z(r) = \frac{r^2/R}{1+\sqrt{1-(1+c)(r/R)^2}} + a_1 r + a_2 r^2 + a_3 r^3 + a_4 r^4 + a_5 r^5 + a_6 r^6 + \ldots$$

where:
r represents the distance of a given point from the optical axis, the axis of the mirror 72 being positioned on the optical axis of the objective;

Z represents the distance of this point from a plane perpendicular to the optical axis;

the coefficient c is the conic;

the parameter R corresponds to the radius of curvature of the surface; and the parameters $a_1, a_2, \ldots a_i$ are asphericity coefficients of order 1, 2 and i, respectively.

Figure 10:
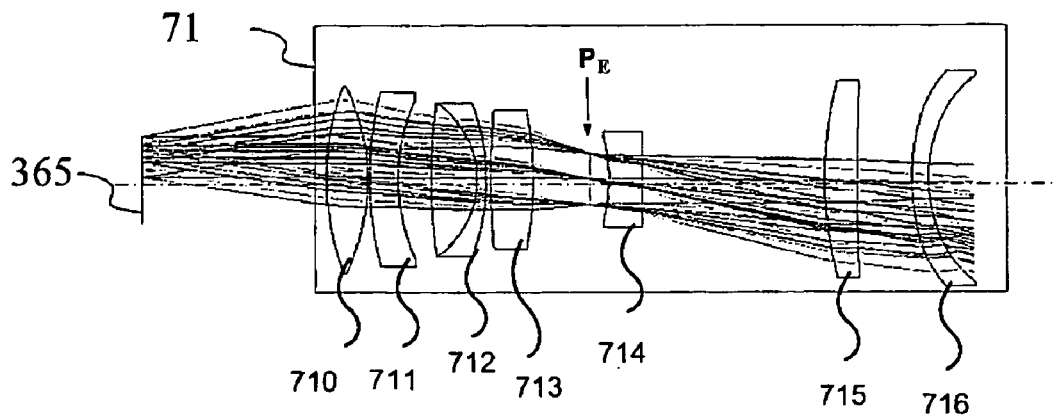

FIG. 10 shows in greater detail the objective 71 adapted to the concave mirror 72.

The objective 71 comprises a rear group of lenses 711 to 713 and a front group of lenses 714 to 716.

The last lens 716 of the objective 71 in the path of the beam 37 is preferably an aspherical meniscus lens 72. Its shape is therefore preferably given by an aspherical surface equation as shown above.

As an illustration, in one particular embodiment the radius R of the concave mirror 72 is 60, the parameters c and $a_1$ to $a_8$ are, respectively, the following: $-1.59311$ mm; 0; 0; $-8.94 \times 10^{-6}$; 0; $1.64 \times 10^{-9}$; $-9.74 \times 10^{-13}$; $-7.84 \times 10^{-14}$; and $2.31 \times 10^{-16}$. The radius R of the first surface (the modulator side) of the meniscus 206 is 44.94711 mm, and the parameters c and $a_1$ to $a_8$ have, respectively, the following values: 0; 0; 0; $-3.1 \times 10^{-4}$; $2.88 \times 10^{-5}$; $1.96 \times 10^{-6}$; $7.14 \times 10^{-8}$; $4.15 \times 10^{-10}$; and $-4.30 \times 10^{-10}$. The radius R of the second surface (the imager side) of the meniscus 206 is 29.49554 mm and the parameters c and $a_1$ to $a_8$ have, respectively, the following values: 0; 0; 0; $-2.7 \times 10^{-4}$; $9.97 \times 10^{-6}$; $6.34 \times 10^{-7}$; $-1.41 \times 10^{-7}$; $8.98 \times 10^{-9}$; and $-1.78 \times 10^{-10}$.

Advantageously, according to the invention, the front lens group comprises three lenses, the two lenses located in the extreme positions having a power opposite that of the lens located in the middle. Thus, the front group contributes to generating a curvature of the intermediate image so that the projected image is plane, while comprising a small number of lenses. This makes its manufacture easier and reduces its cost.

Thus, the front lens group illustrated in FIG. 10 comprises two negative-power lenses 714 and 716 (divergent lenses) surrounding a positive-power lens 715 (convergent lens).

According to a variant of the invention, the objective 71 is replaced with an objective of lower quality, in particular with an MTF (Modulation Transfer Function), the distortion moreover remaining similar to that of the objective 71. Such an objective is less expensive, the material of the lenses itself being less expensive and the number of lenses being reduced.

Figure 11:
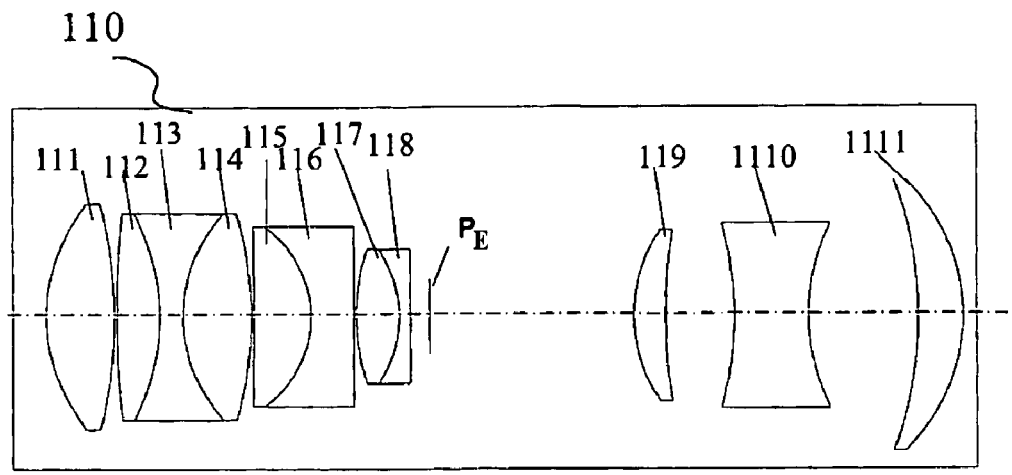

According to a variant of the invention, the front lens group of the objective comprises two positive (convergent) lenses surrounding a negative lens. An objective 110 comprising such a front group and able to replace the objective 71 is illustrated in FIG. 11.

The objective 110 comprises a rear lens group consisting of the lenses 111 to 118 and a front lens group consisting of the lenses 119, 1110 and 1111, said lens groups being placed on either side of the exit pupil $P_E$ of the objective.

As an illustration, the characteristics of the objective 110 are given in the following table (the radii, thicknesses and diameters all being expressed in millimetres and the material of the lenses 111 to 119, 1110 and 1111 corresponding to the references of the products provided by the company OHARA®):

| Lens | Radius of curvature (in mm) | Thickness (in mm) | Material | Diameter (in mm) |
|---|---|---|---|---|
| 111 | 36.43399 | 16.245 | acrylic | 48 |
|  | −104.8294 | 0.500 |  | 48 |
| 112 | 206.176 | 9.538 |  | 46 |
| 113 | −48.868 | 5.389 |  | 46 |
| 114 | 33.95 | 14.933 |  | 46 |
|  | −83.67 | 0.500 |  | 46 |
| 115 | infinite | 12.658 |  | 36 |
| 116 | −22.648 | 2.626 |  | 36 |
|  | infinite | 0.500 |  | 36 |
| 117 | 47.785 | 9.381 |  | 28 |
| 118 | −27.09 | 2.493 |  | 28 |
|  | infinite | 5.974 |  | 28 |
| PS | infinite | 41.998 |  | 16.58 |
| 119 | 33.768 | 6.849 |  | 38 |
|  | 120.842 | 14.926 |  | 38 |
| 1110 | −77.81 | 16.188 |  | 41 |
|  | 46.246 | 24.299 |  | 41 |
| 1111 | −86.258 | 9.816 |  | 60 |
|  | −41.781 | — |  | 60 |

The device 7 has the advantage of a relatively small height h below the LCD screen 31, typically between 10 and 20 cm for a display with a diagonal of about 1.50 m. This height h is in fact sufficient to house the objective 71 and the mirror 72, while still forming a correct backlighting beam image 73 on the means 32 without the beam 37 encountering the objective 71. Preferably, the height h is equal to one fifth (approximately) of the height of the display. More precisely, the height h is less than or equal to the height of the display divided by 5.

FIGS. 8 and 9 illustrate a side view and a top view, respectively, of the device 7 as shown schematically in FIG. 7.

To reduce the depth of the device 7, a folding mirror 75 is interposed between the objective 72 and the concave mirror 72. The dotted lines and the full lines represent, respectively, the elements with the beam 37, 73 not folded and folded, respectively. The mirror 74 is vertical (that is to say parallel to the screen 31), the optical axis of the beam 37 before the mirror 72 being horizontal. The long side of the imager 365 of the device 7 is horizontal (for a vertical LCD screen 32 whose long side is horizontal).

The objective 71 is placed along the side and folded preferably in a horizontal plane placed along the side, preferably with an axis parallel to the screen 32, thereby making it possible to reduce the depth of the device 7. The angle α that the mirror 75 makes with a normal to the screen 32 depends on the angle that the optical axis of the objective 70 makes with the screen 32. When the objective 70 is parallel to the screen 32, the angle α is equal to 45°. The distance between the objective 70 and the mirror 72 is such that the beam 73 does not encounter the objective 70.

In general, all the optical axes of the various elements of the unfolded projection system are perpendicular to the plane of projection, assumed to be vertical. They are therefore horizontal (for a system as shown in unfolded form, with the exception of the folding due to the concave folding mirror).

In the device 7, the real axis of the objective 70 remains horizontal, the screen 32 being vertical. The device 7 has a relatively small "chin", that is to say a relatively small value of h. Thus, for a device with a 50" LCD screen, the height h is for example less than 20 cm and typically equal to 12 cm.

However, in alternative embodiments that allow the illumination part to be housed more easily (inclination of the optical illumination core, lamp casing, electronic card attached to the modulator 365), the real axis of the objective is inclined. This is because the axis of one element of the projection system may become non-horizontal after being folded by a folding mirror. For example, if the large mirror is inclined, all the following elements will also be inclined through twice the angle, in particular the concave mirror.

According to a variant, the device 7 comprises other folding mirrors, especially in the objective and the mirror 72.

Figure 12:
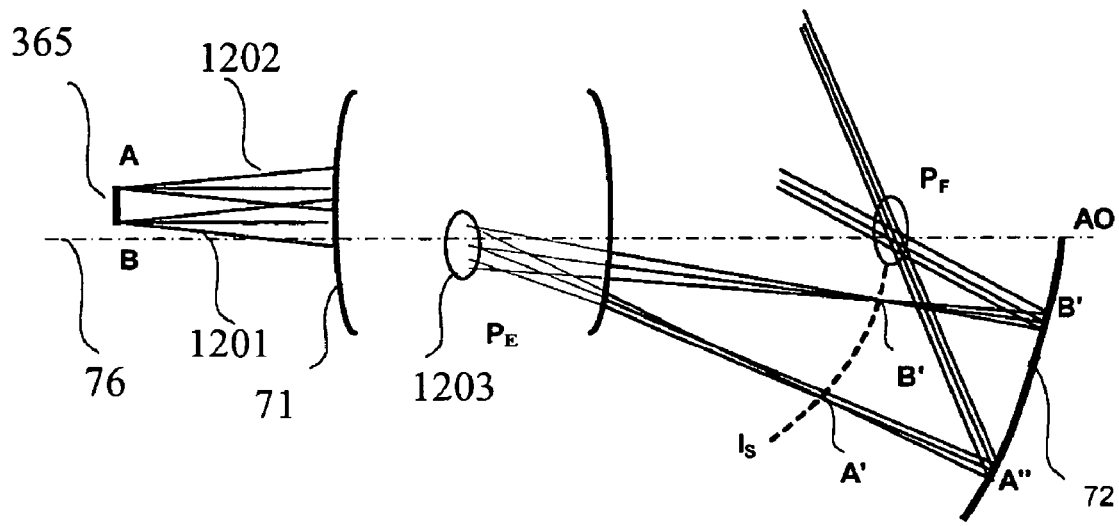

FIG. 12 illustrates the optical properties of the device 7. More precisely, the objective 71 creates, from the incident illumination beam, a first image comprising two points A and B indicated by way of illustration. Emanating from these two points A and B are two beams, 1202 and 1201 respectively, which form, after passing through the objective 70 comprising at least one lens 1202 and an exit pupil $P_E$ 1203, two points A' and B' belonging to the image $I_S$ created by the objective 71.

The beams 1202 and 1201 are reflected, in non-discrete regions A" and B" respectively, off the mirror 72 and converge on a region corresponding to the pupil $P_F$, the image of the pupil $P_E$ via the mirror 72.

It should be noted that the pupil $P_F$ is relatively close to the mirror 72 and that the pupil $P_E$ is further away from the mirror 72. Typically, the distance of the exit pupillary region $P_F$ from the vertex of the concave mirror 72 is between 25 mm and 60 mm. Preferably, the distance of the exit pupil 1203 from the concave mirror 72 must be as large as possible.

According to a variant, the objective comprising a diaphragm S consists of a first assembly formed from at least one lens and of a second assembly formed from at least one lens. The second assembly is positioned after the diaphragm S in the path of the imaging beam and is closer to the image $I_S$ than the diaphragm S. Preferably, the distance d1 between the second assembly and the exit pupil $P'_E$ of the first assembly is equal to or greater than three times the distance d2 between the first assembly and the modulator 365. The exit pupil $P'_E$ corresponds to an image of the diaphragm S formed by the first lens assembly. The second lens assembly positions the exit pupil $P_E$ of the objective substantially at infinity. Thus, the second lens assembly rectifies the rays of the imaging beam and enables the size of the concave mirror to be reduced, while keeping, moreover, its shape.

Advantageously, according to a variant, the device 7 includes a mask (for example an apertured black plate, or glass or plastic plate) that includes a transparent region for passage of the projection beam 73. The thickness of the mask is chosen to be as small as possible and preferably less than 2 mm, and even more preferably equal to 1 mm or less. This mask is located near the pupil $P_F$ (typically at a distance of 5 mm or less from the pupillary region $P_F$ corresponding to the exit pupil of the system comprising the objective and concave mirror) and absorbs the parasitic rays via a black region which does not cut off the beam 37, 73. The black peripheral region corresponds either to a bulk-tinted region of the mask or to a treatment on one or both faces of the mask. Preferably, when the transparent region is a full region, it undergoes an antireflection treatment using techniques well known to those skilled in the art. The mask preferably extends as far as the boundary of the case of the device 7 and thus keeps the objective, the concave mirror and the corresponding modulator free of dust and/or eliminates (or reduces) the parasitic rays emanating from these elements or from the outside. The boundary of the transparent region of the mask comprise normal walls (thereby facilitating its manufacture) or inclined walls (so as to bring the path of the backlighting beam close to the surface of the mask).

Of course, the embodiments of the invention that include a concave mirror are compatible with the variants presented above and especially with implementation without a modulator, with or without means for providing a sequential colour beam (for example a colour wheel), with or without a uniformity filter in the image plane of the light guide (or any other means of creating a uniform source).

The invention is not limited to the embodiments described above and a person skilled in the art will be able to adapt the various elements of the systems and devices described above while still remaining within the scope of the invention.

In particular, the invention is compatible with any type of LCD screen (especially any shape and size).

According to the invention, there may be any number of folding mirrors even though preferably the backlighting system comprises at least two folding mirrors. Folding mirrors may also have any shape. Advantageously, the final folding mirror is plane. Preferably at least one folding mirror is not plane and, for example, is aspherical, and the construction of the objective and its relative position with respect to the non-plane folding mirror are such that the image of the illumination beam projected onto the LCD screen is substantially plane.

The invention is also compatible with any type of projection source with light-emitting diodes or an incandescent lamp associated with a reflector, with or without a colour wheel, with or without a modulator.

Likewise, the invention may be used within the context of a wall with several displays. Thus, according to the invention, several LCD displays may be used (for example two or three rows of superposed or juxtaposed LCD screens), all of the displays (replacing a display in the abovementioned embodiments) being back-lit by a single illumination source, and corresponding optic (objective, folding mirror, Fresnel lens) with or without a modulator.

The invention claimed is:

1. Display device for displaying an image comprising:
a liquid-crystal display screen
a backlighting system comprising:
   an illumination source producing an illumination beam;
   an optical modulator creating a modulated beam from the illumination beam,
   an objective positioned in the path of said modulated beam designed in order to produce an optical imaging beam and to construct a first image positioned after the objective;
   at least one folding mirror illuminated by the modulated beam coming from the objective, being positioned after said first image in the path of said illumination beam and constructing, from the first image, a second image on said liquid-crystal display screen; and
   a Fresnel lens collimating and redirecting on said liquid-crystal display screen the modulated beam reflected by said at least one folding mirror,
wherein the modulated beam transmitted by the Fresnel lens back-light said liquid-crystal display screen,
a controller for controlling said optical modulator and,
a controller for controlling said liquid-crystal display screen such that said liquid-crystal display screen displays the image.

2. Display device according to claim 1, wherein said folding mirror or at least one of said folding mirrors is an aspherical mirror.

3. Display device according to claim 1, wherein said folding mirror or at least one of said folding mirrors is a concave mirror.

4. Display device according to claim 3, wherein said concave mirror has an optical axis positioned on the optical axis of the objective.

5. Display device according to claim 3, wherein the backlighting system includes a mask comprising a black zone that absorbs the parasitic rays and a transparent zone placed in the path of the modulated beam after the concave mirror.

6. Display device according to claim 1, wherein the backlighting system includes means for polarizing the illumination beam, said means being placed before the optical modulator.

7. Display device according to claim 1, wherein the source includes means for producing a sequentially coloured illumination beam.

8. Display device according to claim 1, wherein the backlighting system includes a diffuser placed behind the Fresnel lens.

9. Display device according to claim 1, wherein the optical imaging beam produced by the objective is off-axis with respect to the optical axis of the objective.

10. Display device according to claim 1, wherein:

said illumination beam illuminating said optical modulator is a sequentially-coloured beam, said optical modulator modulates in the white, said liquid-crystal display screen is in the black and white, i.e. does not include pixels with a colour filter, such that the colour of the pixels of the image displayed by the liquid-crystal display screen is determined by the colour of the sequentially-coloured beam.

11. Display device according to claim 1, wherein:

said illumination beam is prepolarized, said optical modulator is of the liquid-crystal display type, there is no analyser after the optical modulator and, there is a polarizer positioned before the liquid-crystal display screen allowing the polarized modulated beam created by the optical modulator to be analyzed.

* * * * *